US009003896B2

(12) United States Patent
Nold et al.

(10) Patent No.: US 9,003,896 B2
(45) Date of Patent: Apr. 14, 2015

(54) DUAL-FLANGE DISC-SHAPED TORQUE SENSOR

(75) Inventors: Werner Nold, Riedstadt (DE); Juergen Andrae, Weiterstadt (DE)

(73) Assignee: Hottinger Baldwin Messtechnik GmbH, Darmstadt (DE)

(*) Notice: Subject to any disclaimer, the term of this patent is extended or adjusted under 35 U.S.C. 154(b) by 67 days.

(21) Appl. No.: 13/259,727

(22) PCT Filed: Mar. 25, 2010

(86) PCT No.: PCT/EP2010/001861
§ 371 (c)(1),
(2), (4) Date: Sep. 23, 2011

(87) PCT Pub. No.: WO2010/108674
PCT Pub. Date: Sep. 30, 2010

(65) Prior Publication Data
US 2012/0144933 A1 Jun. 14, 2012

(30) Foreign Application Priority Data
Mar. 25, 2009 (DE) .......................... 10 2009 014 284

(51) Int. Cl.
G01L 3/02 (2006.01)
G01L 3/14 (2006.01)
(52) U.S. Cl.
CPC .................................... G01L 3/1457 (2013.01)
(58) Field of Classification Search
CPC ..... G01L 25/003; G01L 5/161; G01L 3/1457; G01M 17/013
USPC ...................... 73/862.041–862.046
See application file for complete search history.

(56) References Cited

U.S. PATENT DOCUMENTS 3,771,359 A * 11/1973 Shoberg .................... 73/862.044
4,573,362 A * 3/1986 Amlani ..................... 73/862.045
(Continued)

FOREIGN PATENT DOCUMENTS

CN 1480718 A 3/2004
CN 1914493 A 2/2007
(Continued)

OTHER PUBLICATIONS

International Search Report of the International Searching Authority for International Application PCT/EP2010/001861, mailed Aug. 3, 2010, 3 pages, European Patent Office, HV Rijswijk, Netherlands.
(Continued)

*Primary Examiner* — Max Noori
(74) *Attorney, Agent, or Firm* — W. F. Fasse

(57) ABSTRACT

A torque sensor includes a central hub, a fastening ring arranged radially outwardly from and coaxially circumferentially around the central hub, a continuous imperforate flange disc that extends radially between and interconnects the central hub and the fastening ring, and strain gages or other force transducers for measuring a torsional shear strain in the flange disc. The flange disc has blind pocket recesses that are recessed into the flange disc from one or both axial sides thereof. Each pocket recess is bounded at the bottom by a pocket recess floor. Strain transducers are mounted on the inner surfaces of the pocket recess floors in the pocket recesses and/or on the outer back surfaces of the pocket recess floors on the opposite side of the flange disc. The strain transducers measure torsional shear strain in the recess floors.

19 Claims, 2 Drawing Sheets

(56) References Cited

U.S. PATENT DOCUMENTS

| | | | |
|---|---|---|---|
| 5,648,617 A * | 7/1997 | Cullen et al. | 73/862.045 |
| 5,672,834 A | 9/1997 | Searle et al. | |
| 5,894,094 A * | 4/1999 | Kuchler et al. | 73/862.044 |
| 6,550,346 B2 * | 4/2003 | Gombert et al. | 73/862.043 |
| 6,694,828 B1 * | 2/2004 | Nicot | 73/862.326 |
| 7,093,477 B2 | 8/2006 | Herbold et al. | |
| 7,520,182 B2 * | 4/2009 | Takamura et al. | 73/862.321 |
| 8,627,730 B2 * | 1/2014 | Valov et al. | 73/862.09 |
| 2004/0007082 A1 | 1/2004 | Herbold | |
| 2008/0204266 A1 | 8/2008 | Malmberg et al. | |
| 2010/0162830 A1 | 7/2010 | Meuter et al. | |

FOREIGN PATENT DOCUMENTS

| | | |
|---|---|---|
| CN | 101535789 A | 9/2009 |
| DE | 42 08 522 | 9/1993 |
| DE | 44 30 503 | 2/1996 |
| DE | 196 40 717 | 4/1998 |
| DE | 101 06 625 | 6/2002 |
| DE | 103 04 359 | 11/2003 |
| DE | 102008021774 | 12/2009 |
| EP | 1 074 826 | 2/2001 |
| GB | 939 175 | 10/1963 |
| GB | 2 292 811 | 3/1996 |
| JP | 04-074741 U | 6/1992 |
| JP | 2001-330525 A | 11/2001 |
| JP | 2003-083824 A | 3/2003 |
| JP | 2007-040774 A | 2/2007 |
| WO | WO 2005/075950 | 8/2005 |

OTHER PUBLICATIONS

English Translation of PCT Written Opinion of the International Searching Authority for International Application PCT/EP2010/001861, mailed Aug. 3, 2010, 9 pages, European Patent Office, HV Rijswijk, Netherlands.

German Office Action in German Patent Application 10 2009 014 284.3-56, mailed Feb. 8, 2010, 4 pages; with partial English translation, 2 pages.

"Hochgenauer Xurzbauender Drehmomentmessflansch für Rotierende Wellen", ("Highly Accurate Short-Structured Torque Measuring Flange for Rotating Shafts"), Manner Sensortelemetric GmbH, Spaichingen, Germany, Mar. 16, 2009, 20 pages.

"Drehmomentmessflansch" ("Torque Measuring Flange"), Manner Sensortelemetrie GmbH, Spaichingen, Germany, Nov. 11, 2002, 20 pages.

Drehmomentmessflansche der Reihe TF ("Torque Measuring Flanges of the Series TF"), Magtrol SA, Rossens/Freiburg, Switzerland, Sep. 2008, 11 pages.

Chinese Examiner Long Han, Chinese Office Action and Search Report in Chinese Patent Application No. 201080013711.2, mailed Jan. 29, 2013, 11 pages, with English translation, 10 pages.

Chinese Office Action in Chinese Patent Application No. 201080013711.2, mailed Sep. 27, 2013, 3 pages, with English translation, 1 page.

German Translation of Japanese Office Action in Japanese Patent Application No. 2012-501186, mailed Jan. 8, 2013, 8 pages.

German Translation of Japanese Office Action in Japanese Patent Application No. 2012-501186, mailed Mar. 4, 2014, 3 pages.

* cited by examiner

DUAL-FLANGE DISC-SHAPED TORQUE SENSOR

FIELD OF THE INVENTION

The invention relates to a torque sensor having strain gages or other force transducers applied on a disc-shaped measuring flange.

BACKGROUND INFORMATION

On rotating machines, it is often necessary to detect the torques thereof during the operation. For that, especially torques of rotating shafts are measured, of which the torque transducers rotate synchronously with the shaft and permanently detect the torque or rotational moment transmitted through the shaft. For this, often torque sensors equipped with torque measuring strips or torque gages are utilized, which are positioned between the rotating shaft parts and are fastened thereon. For that, the torque transducers usually have ring-shaped or annular fastening flanges, which are screwed or bolted together with oppositely lying flanges of the shafts. In that regard it is often necessary that the torque transducers are also fastened in relatively short shaft pieces or between existing available flanges, whereby only little axial structural space is available. In that regard, such fastenings must be carried out such that as little as possible interfering stresses or interfering forces can get into the strain measuring body or deformation body, in order to ensure a high measuring accuracy.

A very short structurally assembled torque sensor is known from the DE 42 08 522 C2, which is embodied with a disc shape. This one-piece torque transducer consists of an outer ring and an inner hub concentric thereto, which are connected with one another through four radially extending measuring webs. In that regard, the measuring webs comprise axial opposite-lying pocket-shaped recesses, through which a thin-walled end face remains at the base of the pocket, onto which shear force transducers in the form of foil strain gages are applied. In that regard, the shear force transducers detect the transmitted torque on the strain measuring bodies on the base of the pockets. For introducing (or inputting) and leading out (or outputting) the torque that is to be transmitted, preferably eight bores are introduced both into the inner hub as well as into the outer ring, onto which bores the shaft ends are securely screwed. Because the fastening bores of the inner hub are arranged relatively close to the measuring webs, interfering bending stresses or other parasitic forces can have an influence on the measuring webs due to different screwing connections and production tolerances, and these interfering bending stresses or other parasitic forces then falsify the measuring result.

A torque sensor in which the fastening areas are located relatively far away from the strain measuring body is known from the EP 1 074 826 B1. This torque sensor is embodied in a one-piece manner and includes two axially opposite-lying fastening flanges, which are connected with one another by a short axial torque transmission element at a radially inwardly lying area. The torque transmission element consists of an inwardly closed cylindrical circumferential surface and radially outwardly directed axial webs, between which measuring pockets are arranged coaxially to the rotation axis. Through the measuring pockets there arise thin membrane-like strain areas as deformation bodies, on which strain gages are applied, which supply an exact measuring signal, which is proportional to the transmitted torque. Because the two fastening flanges comprise an equally large diameter and the fastening bores are arranged on the outer ring surfaces thereof, it is ensured that interfering bending stresses or other parasitic forces are hardly effective or active in the strain measuring bodies lying symmetrically therebetween, whereby the strain measuring bodies have the strain gages. However, the pipe-shaped measuring body is arranged in the longitudinal direction between the two fastening flanges, so that such a torque sensor is structurally too long for many applications and therefore is not utilizable in short shaft areas.

From the DE 44 30 503 C1, there is known a longitudinally very short torque sensor, which similarly comprises two equally sized rotationally symmetrical fastening flanges. These are arranged parallel and lying axially opposite, are embodied disc-shaped, and are welded together with one another radially inwardly through a massive ring-shaped force transmission part. Thereby, the two fastening flanges are spaced axially from one another by only a small air gap. In that regard, one of the two fastening flanges is equipped with a strain measuring body encircling around coaxially to the rotation axis, on the ring-shaped outer end face of which strain gages in the form of shear force transducers are applied. In that regard, the strain measuring body is formed by two axially opposite, coaxially encircling annular or ring grooves, which are machined out of the fastening flange embodied as a measuring flange. The strain measuring body remaining between the ring grooves is thereby arranged radially between the ring-shaped outer fastening part and the inwardly lying force transmission part. Due to the radially diminishing tangential force effect, the circular ring-shaped strain measuring body part is embodied with a uniformly diminishing thickness from the inside toward the outside. Because the entire torque must be transmitted via the circular ring-shaped measuring body part, its axial thickness is dimensioned relatively large, whereby the measuring sensitivity is reduced. Simultaneously, interfering bending stresses or other parasitic forces are also transmitted via the uniform circular ring-shaped embodied measuring body part, whereby the measuring accuracy can additionally be impaired.

SUMMARY OF THE INVENTION

Therefore, it is the underlying object of the invention to provide a torque sensor with the shortest possible structure, of which the sensitivity and the measuring accuracy is improved.

This object is achieved by embodiments of the invention set forth herein. Further developments and advantageous example embodiments are also set forth herein.

A torque sensor according to one embodiment of the invention includes a central hub, a fastening ring arranged radially outwardly from and coaxially circumferentially around the central hub, a continuous imperforate flange disc that extends radially between and interconnects the central hub and the fastening ring, and strain gages or other strain transducers for measuring a torsional shear strain in the flange disc. The flange disc has blind pocket recesses that are recessed into the flange disc from one or both axial sides thereof. Each pocket recess is bounded at the bottom by a pocket recess floor. The strain transducers are mounted on the inner surfaces of the pocket recess floors in the pocket recesses and/or on the outer back surfaces of the pocket recess floors on the opposite side of the flange disc. Stiffening webs reinforce the flange disc and circumferentially separate the pocket recesses from one another. The strain transducers measure torsional shear strain arising in the recess floors.

The invention has the advantage, that a high rotational stiffness of the strain measuring sensor is achieved through the coaxially encircling closed measuring pockets and stiffening webs. Similarly, the wall thicknesses of the pocket base surfaces can be carried out in a membrane-like thickness as strain or deformation bodies, so that relatively thin spring-elastic strain zones arise, which ensure a high measuring sensitivity. Additionally, a large bending and axial stiffness is achieved by the radial stiffening webs provided between the measuring pockets, whereby interfering forces or other parasitic forces are kept away from the deformation zones in the pocket base surfaces, so that advantageously a high measuring accuracy is achievable.

The invention further has the advantage that large torques can be transmitted with high rotational stiffness through the whole-side closed fastening flanges that are provided with stiffening webs, even with a thin disc-shaped embodiment. Through the small material thicknesses of the disc-shaped base body it is similarly possible to achieve a torque sensor with a small inertial moment, which advantageously also makes high measuring rotational speeds possible.

In a further development of the concept of the invention it is provided to produce the torque sensor as a one-piece base body with the fastening flanges, the torque transmission element as well as the stiffening webs and the measuring pockets, with the aid of conventional turning and milling operations, whereby the hysteresis characteristic of the torque sensor is considerably improved compared to bolted or welded parts. Because hereby no frictional or settling characteristics can arise, a constantly high measuring accuracy is durably or long-lastingly ensured.

In a further particular embodiment it is provided to arrange the measuring pockets lying axially opposite. This has the advantage that due to such a symmetrical arrangement, the interfering bending stresses and parasitic interference forces in the strain measuring area of the pocket base surfaces can be reduced, whereby the measuring accuracy can be improved. Especially when shear force transducers are also applied in the oppositely lying measuring pockets, thereby the axial bending stresses can advantageously be compensated.

In a preferred embodiment it is provided to arrange the measuring pockets lying opposite, yet however respectively in a tangentially offset arrangement. Hereby there also arises a largely symmetrical strain progression, largely without interfering bending stresses and parasitic interference forces, whereby however application surfaces for the shear force transducers arise, which lie on the back side of the pocket base surface as a pocket outer surface. This has the advantage, especially with a one-sided and outwardly oriented pocket outer surface, that the application surface does not lie in a recess, whereby the accuracy of the manually performable strain gage application can be improved.

In a further particular embodiment of the inventive concept it is provided to broaden or widen the stiffening webs in the radial direction toward the rotation axis, and thereby simultaneously to correspondingly make the measuring pockets smaller toward the measuring axis. Thereby, the tangential force introduced by the torque is made effective uniformly corresponding to the spacing relative to the rotation axis, so that advantageously a constant shear strain is effective on the entire measuring body surface for a torque that remains constant. Through the radial arrangement of the shear force transducers, this advantageously leads to a high measuring accuracy even for uniformly thin sensitive strain measuring bodies.

In order to decouple parasitic interference forces that falsify measured values, in a further preferred embodiment, an axial annular or ring groove is let into the outwardly lying end face of the measuring flange between its outer ring and the coaxially encircling arranged measuring pockets. Namely, through different tightening torques of the fastening screws and possible production inaccuracies of the fastening bores, this can lead to interfering bending stresses and parasitic forces, which are advantageously kept away from the measuring body surfaces by the encircling ring-shaped groove, whereby a high measuring accuracy can be achieved.

A further particular embodiment of the invention with an axial depression in the radial inner space of the measuring flange radially between the outer ring and the rotation axis has the advantage that thereby the entire sensor electronics, including the strain gages arranged on one side to the inner space and its wire connections can be accommodated in a hermetically sealable manner under a screwed-on or welded-on cover.

In a further particular arrangement there is further provided an antenna part that is melted-in into a dovetail fitting on the outer circumference of the measuring flange, of which antenna part the connection line is similarly led from the outer ring into the sealed inner space. Thereby, advantageously, an entirely hermetically sealed torque sensor is produced, which is also suitable for high measuring rotational speeds up to 50,000 revolutions per minute, due to the dovetail fitting.

BRIEF DESCRIPTION OF THE DRAWINGS

The invention will be explained in further detail in connection with an example embodiment, which is illustrated in the drawing. It is shown by.

DETAILED DESCRIPTION OF EXAMPLE EMBODIMENTS OF THE INVENTION

Figure 1:
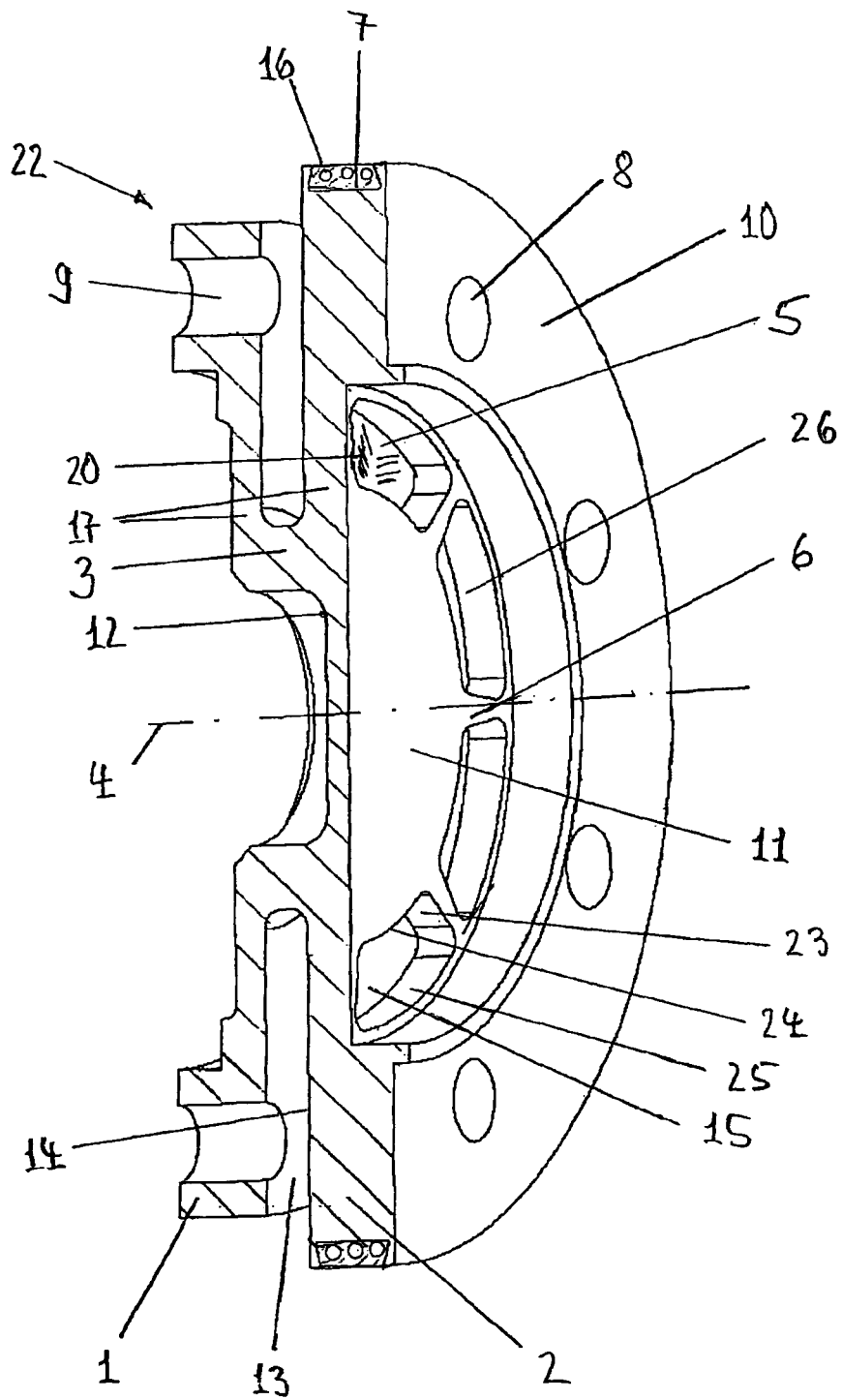
FIG. 1 a sectional view through a torque sensor with axially one-sided arranged measuring pockets, and FIG. 2 a sectional view through a torque sensor with axially two-sided arranged measuring pockets.

In FIG. 1 of the drawing, a one-piece torque sensor is sectionally illustrated, which consists of two rotationally symmetrical, axially opposite-lying, disc-shaped, fastening flanges 1, 2, which are rigidly connected with one another by an annular or ring-shaped moment or torque transmission element 3, whereby preferably eight measuring pockets 5 are provided as recess 5 on an outwardly oriented disc surface of a fastening flange embodied as measuring flange 2 at a spacing to the rotation axis 4 that remains constant, and strain gages 20 as shear force transducers are applied on the base surface 15 of the measuring pockets 5, whereby the measuring pockets 5 are separated from one another by eight radial stiffening webs 6.

The illustrated torque sensor is provided for the measurement of torques up to a nominal torque of 1 kNm between two shaft or machine parts with a nominal rotational speedup to approximately 25,000 revolutions per minute, whereby such torque sensors can also be embodied for nominal torques from 100 Nm up to at least to 10 kNm. In that regard, the shaft or machine parts for the torque input and output are screw-connected with the two fastening flanges 1, 2 via fastening bores 8, 9 located thereon. In that regard, the fastening bores 8, 9 are preferably embodied as through-hole bore 9 on the first fastening flange 1 and as threaded bore 8 on the second fastening flange 2, so that the screw-connection can take place from one axial side. In that regard, the two fastening flanges 1, 2 are augmented or strengthened in their axial thickness in their radially outer area, and are thereby embodied as outer ring 10 and provided with the fastening bores 8, 9. Thereby the outer rings 10 preferably comprise an outer diameter of approximately 130 to 150 mm, whereby the fastening bores 8, 9 are symmetrically distributed relative to the rotation axis 4.

Between the two fastening flanges 1, 2, up to the torque transmission element 3, a radially outwardly open, narrow spacing groove 13 of approximately 2 to 10 mm is milled into a base body 22, so that the two fastening flanges 1, 2 are located axially opposite and spaced apart parallel. In that regard, the opposite-lying fastening flanges 1, 2 within the spacing groove are embodied as planar groove surfaces 14. The second fastening flange 2, which represents a measuring flange, on its axially outer side is provided with a stepped-down structure, through which an inwardly lying depression 11 is formed. Lying radially inwardly relative to the outer ring 10, the measuring flange 2 is provided on the inner disc element 17 with a thinner wall thickness relative to the outer ring 10, through which the torque is transmitted from the outer ring 10 to the radially inwardly lying torque transmission element 3. In that regard, preferably, wall thicknesses of 5 to 10 mm are sufficient in the inner disc element 17, and this pertains on both fastening flanges 1, 2.

An axial blind hole 12 is milled into the center of the first fastening flange 1 symmetrically relative to the rotation axis 4, up to extending into the second fastening flange 2, by which blind hole the inertial mass of the base body 22 is reduced. On the second fastening flange, the measuring flange 2, the cylinder-shaped axial depression 11 is milled-in, lying radially inwardly relative to the outer ring 10 and symmetrically relative to the rotation axis 4, which depression comprises approximately a diameter of 90 to 110 mm and a depth of approximately 5 to 15 mm. Preferably eight approximately 5 to 10 mm deep measuring pockets 5 are milled into this depression 11 symmetrically relative to the rotation axis 4, wherein the measuring pockets leave a uniform thickness of 0.2 to 1 mm remaining to the groove surface 14, and axially outwardly form a planar base surface 15.

In that regard, strain gages in the form of shear force transducers 20 are applied on the base surface 15, whereby at least four or eight strain gages 20 are provided symmetrically distributed relative to the rotation axis 4. On their radial inner wall 24, the measuring pockets 5 comprise a rounding with a diameter of approximately 35 mm, and on their radial outer wall 25 comprise a rounding with a diameter of approximately 45 mm relative to the rotation axis 4, whereby the measuring pockets 5 in their angular or circumferential length extend over an angular range of approximately 40° between their side walls 23 and thereby represent an annular or ring groove section 26 about the rotation axis 4.

Stiffening webs 6 are left to remain between the measuring pockets 5, wherein the stiffening webs on their radially inwardly lying beginning have a web width of approximately 5 mm with a web height of preferably approximately 5 mm, and comprise a uniform tapering to approximately 3 mm radially toward the outer ring 10. Through this prescription of the shape of the measuring pockets 5, under a torque loading of the torque sensor, there arises on the base surface 15 a uniform strain zone, which is independent of the spacing distance relative to the rotation axis 4. Thereby, a strengthening or reinforcement in the rotation direction and in the axial direction is achieved by the stiffening webs 6, so that a high measuring sensitivity is achievable through the relatively thin strain zones within the measuring pockets 5.

In an alternative embodiment of the torque sensor, it can also be equipped with at least 3, 4, 8, 16 or up to 32 measuring pockets 5, on the base surfaces 15 of which at least four shear force transducers are applied at angles of preferably 90° and 45° symmetrically relative to the rotation axis 4. In that regard, the dimensions especially of the stiffening webs 6 and of the base surface thickness as a strain measuring or deformation body 15, are dependent on the nominal torques to be transmitted. Also the diameters and thicknesses of the fastening flanges 1, 2 is dependent on the prescribed nominal torques, so that for a nominal torque of e.g. 100 Nm preferably a flange diameter of approximately 120 mm is provided, and for a nominal torque of e.g. 10 kN preferably a fastening flange diameter of approximately 260 mm at outer ring thicknesses of approximately 15 to 30 mm, are provided. From that there arise axial lengths of the torque sensor of approximately 35 to 65 mm for nominal torques from 100 Nm to 10 kNm, which are constructed extremely short and therefore are utilizable for nearly all application cases.

In an embodiment of the above described torque sensor that is not illustrated, the measuring pockets 5 can also be arranged lying axially opposite, which are respectively separated from one another by their remaining base surfaces 15 as strain measuring bodies. Thereby, there arise openings of the measuring pockets 5, which are oriented on the one hand toward the groove surfaces 14, and on the other hand toward the depression 11. In that regard, preferably the strain gages 20 are applied on the base surfaces 15 that are oriented toward the depression 11, whereby this embodiment is then hermetically sealable. On the other hand, shear force transducers 20 can be applied also on the oppositely-lying base surfaces that are oriented toward the groove surfaces 14, whereby advantageously also interfering bending stresses can be compensated.

For the evaluation and feeding (supply) of the strain gages 20, a measuring electronics, which is not illustrated, is additionally fitted into the depression 11, and by this measuring electronics the shear force transducers 20 are especially circuit-connected into a Wheatstone bridge, the measuring signals are amplified, digitized and modulated for transmission. For that, the measuring electronics circuit that is arranged in the provided depression 11 is preferably hermetically enclosed with a cover that is not illustrated and that is free of force shunting, through a sealed screw or weld connection, whereby the sensitive measuring elements are accommodated in a moisture-free and dust-free manner.

For the transmission of the measuring signal, an antenna 16 is cast or molded into the outer circumference of the outer ring 10 of the measuring flange 2. For preventing a loosening or release dependent on centrifugal force, in that regard the antenna windings of the telemetry system are cast or molded into a dovetail groove 7 that tapers narrower outwardly. Thereby, nominal rotational speeds of at least 25,000 up to 50,000 revolutions per minute can be carried out with the above described torque sensor, without thereby allowing the antenna windings of the telemetry system to be loosened or released dependent on centrifugal force.

With regard to the introduction or inputting of a torque through the first fastening flange 1, this torque is introduced via the outer ring 10 and the radially inner disc element 17 to the moment or torque transmission element 3, and from this element into the measuring flange 2. There the torque is transmitted from the inwardly lying introduction area of the disc element 17 via the stiffening webs 6 and the base surface 15 as a strain measuring body of the measuring pockets 5, to the outer ring 10 of the measuring flange 2. Thereby, due to the tangential transmission forces, at least a tangential strain arises in the membrane-like base surfaces 15 of the measuring pockets 5, and this strain is proportional to the transmitted torque and is detected by the shear force transducers 20. With the aid of a Wheatstone bridge circuit, the transmitted torque is formed or determined from the detected measuring signals. From that, the measuring electronics produce the modulated measuring signals, which are transmitted via the antenna coil 16 present in the outer ring 10 in a contact-less manner to a stationary evaluating apparatus, where these are displayable as a measured value or are available, for example, to regulating processes to be further processed.

Figure 2:
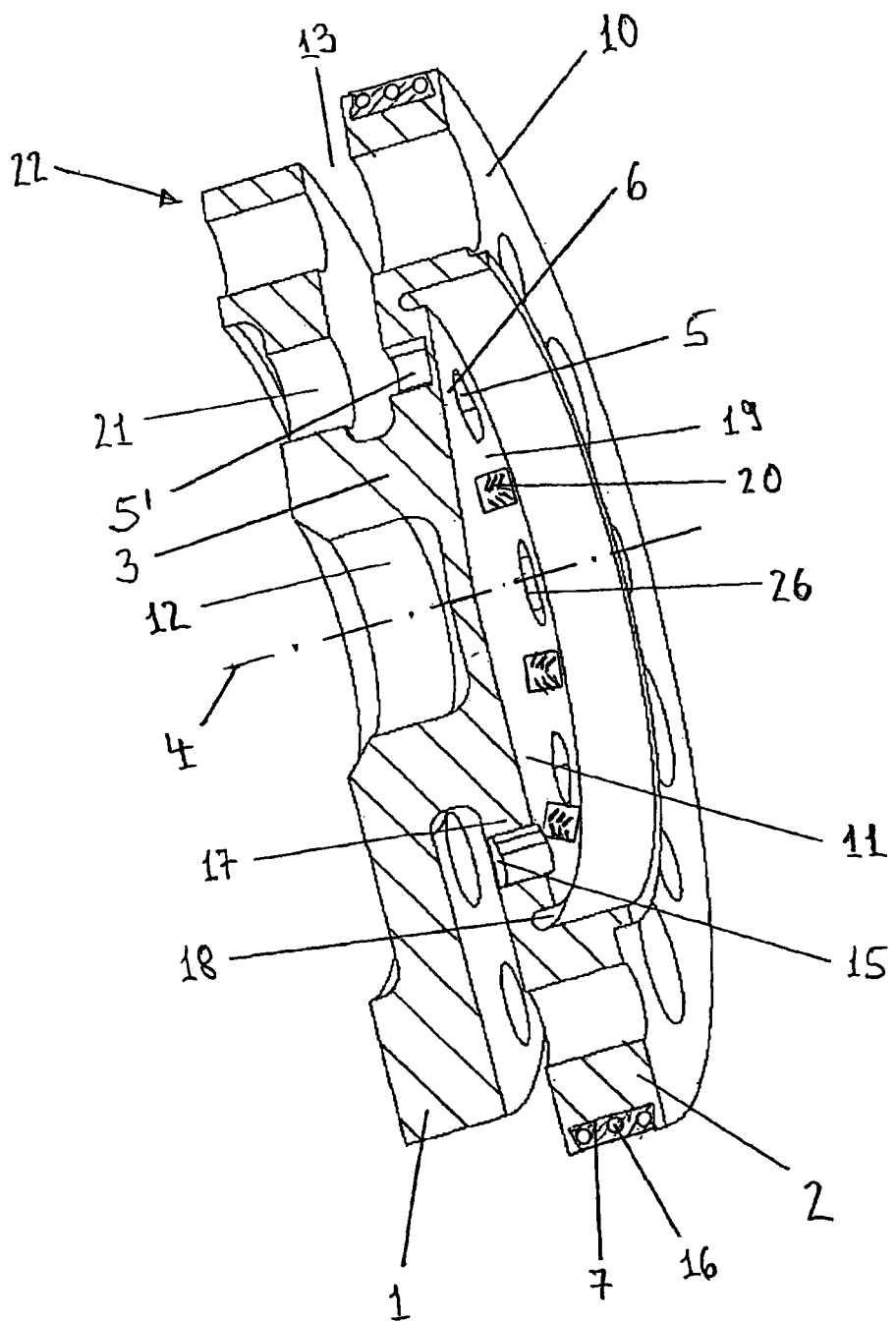

In FIG. 2 of the drawing there is illustrated an advantageous embodiment of a torque sensor which essentially is distinguished from the embodiment according to FIG. 1 by an axially and tangentially offset arrangement of the measuring pockets 5. In that regard, the torque sensor similarly consists of a base body 22 with two fastening flanges 1, 2 that are arranged lying opposite and parallel, and that are connected axially with one another via a ring-shaped torque transmission element 3. Thereby the measuring flange as the second fastening flange 2 similarly comprises a cylindrical depression 11 oriented axially from the outside toward the inside, which depression is additionally decoupled from the outer ring 10 with respect to interfering forces by an axially introduced load relief groove 18. Namely, in the event of non-uniform screw-connections of the fastening flanges 1, 2 with the shaft ends or in the event of other axial bending stress loads, these interferences are kept away from the spring-elastic deformation bodies on the base surface 15 of the measuring pockets 5 by the load relief groove 18.

Lying radially inwardly relative to the load relief groove 18, the coaxially encircling measuring pockets or measuring pocket sections are arranged about the rotation axis 4, and are similarly separated from one another by stiffening webs 6. However, in the embodiment according to FIG. 2 of the drawing, the measuring pockets 5 are axially and tangentially alternately offset relative to one another. In that regard, both eight measuring pockets 5 are oriented axially outwardly and eight measuring pockets 5' are arranged axially open to the spacing groove 13. The measuring pockets 5, 5' in that regard encompass a groove-shaped circular section or segment as an annular or ring groove section 26 in a prescribed spacing distance to the rotation axis 4 of approximately 18° to 20°, whereby the stiffening webs 6 therebetween encompass a ring-shaped circular section or segment of approximately 2° to 5°. Thereby, however, the circular segments of the stiffening webs 6 are reciprocal to the measuring pockets 5, 5', and thus are wider radially inwardly than outwardly.

Relatively wide planar surface sections arise tangentially between the measuring pockets 5, 5' due to the measuring pockets 5, 5' being alternately offset axially relative to one another, and these relatively wide planar surface sections essentially represent the pocket outer surface 19 that lies axially opposite the pocket base surface 15, and the pocket outer surface 19 acts on both sides as a membrane-like spring-elastic deformation body. Therefore, the strain gages 20 embodied as shear force transducers are applied at least within the depression 11 on the pocket outer surface 19. This is especially advantageous because thereby the manual mounting of the strain gages 20 is simplified and can be carried out more exactly.

The strain gages 20 could also be arranged lying axially opposite on the pocket outer surfaces 19 relative to the spacing groove 13, whereby these would not be hermetically tightly sealable with respect to external influences. The milling-out of the measuring pockets 5' oriented toward the spacing groove 13 then is carried out advantageously through the access bores 21 additionally provided in the first fastening flange 1, whereby the access bores 21 are arranged at a prescribed radial spacing distance symmetrically relative to the rotation axis 4, whereby the diameter thereof corresponds at least to the tangential extension of the measuring pockets 5'.

Through the tangentially and axially offset measuring pockets 5, 5' not only is the mounting of the strain gages 20 simplified, but also the decoupling of interfering clamping forces and bending stresses is improved, because these are then largely kept away from the measuring body surfaces. Otherwise, the torque sensor according to FIG. 2 of the drawing is embodied identically to the embodiment according to FIG. 1. In that regard, both base bodies 22 are machined in a one-piece manner from a short round metal rod material, which preferably consists of a rust-free or stainless steel alloy, which comprises a particularly spring-elastic strain behavior and a small hysteresis. The base body 22 may, however, also consist of aluminum, titanium or other metals. As the shear force transducers, it is also possible to use corresponding transducers that are embodied as surface wave resonators or as magnetoresistive or magnetoelastic sensors that detect strain on a deformation body.

The invention claimed is:

1. A torque sensor that comprises two parallel, axially opposite, disc-shaped, fastening flanges (1, 2), which are rigidly connected with one another by a radially inwardly lying torque transmission element (3), whereby one fastening flange (2) is embodied as a measuring flange, which comprises several imperforate blind pocket recesses (5, 5') on a coaxial encircling area that extends radially between a radially outer fastening ring surface (10) of the measuring flange and the radially inwardly lying torque transmission element (3), shear force transducers (20) are applied on blind floor surfaces (15) in the blind pocket recesses or on outer surfaces (19) on a backside of the blind floor surfaces of the pocket recesses (5, 5'), and the coaxial encircling area of the measuring flange further comprises at least three radial stiffening webs (6) at positions respectively circumferentially between and separating the blind pocket recesses from one another, wherein the coaxial encircling area of the measuring flange (2) is a solid axially imperforate disc that is circumferentially and radially continuous and that extends radially from the radially inwardly lying torque transmission element to the radially outer fastening ring surface (10).

2. The torque sensor according to claim 1, characterized in that the base surface (15) of the measuring pockets (5, 5') is embodied as a planar closed or continuous surface, which represents a uniform thin spring-elastic deformation body, on the base surface (15) of which or on the pocket outer surface (19) lying axially opposite thereto, the shear force transducers (20) embodied as strain gages are applied.

3. A torque sensor for measuring a torque between first and second rotational components, said torque sensor comprising:
 a central hub that is to be connected to the first rotational component;
 a fastening ring that is arranged radially outwardly from and coaxially circumferentially around said central hub, and that is to be connected to the second rotational component;
 a circumferentially and radially continuous and axially imperforate flange disc that extends radially between and interconnects said central hub and said fastening ring, wherein said flange disc has first and second disc surfaces that face axially opposite one another, and plural blind pocket recesses that are recessed axially into at least one of said first and second disc surfaces and that are each respectively axially bounded by a respective pocket recess floor, wherein each said pocket recess floor respectively has an inner floor surface bounding said respective pocket recess and an outer floor surface axially opposite said inner floor surface; and shear force transducers arranged on a plurality of said floor surfaces so as to measure torsional shear strain arising in said pocket recess floors having said shear force transducers thereon.

4. The torque sensor according to claim 3, further comprising a fastening flange that is connected to and extends radially outwardly from said central hub, and that is axially spaced away from said flange disc and said fastening ring, wherein said fastening flange is to be connected to the first rotational component whereby said fastening flange connects said central hub to the first rotational component, and wherein said first disc surface of said flange disc faces axially toward said fastening flange.

5. The torque sensor according to claim 3, wherein said flange disc further has plural stiffening webs extending radially at locations circumferentially between respective circumferentially adjacent ones of said pocket recesses, and wherein said stiffening webs have an axial thickness greater than an axial thickness of said pocket recess floors.

6. The torque sensor according to claim 5, wherein said stiffening webs have a circumferential width that tapers radially outwardly.

7. The torque sensor according to claim 5, wherein said pocket recesses are respectively configured as annular ring segments each having a circumferential angular width in a range from 18° to 110°, and said stiffening webs each have a circumferential angular width in a range from 1.25° to 15°.

8. The torque sensor according to claim 3, wherein each said pocket recess floor is a uniformly thin solid wall bounded between said inner and outer floor surfaces thereof, which are planar and extend parallel to one another, and wherein said uniformly thin solid walls form spring-elastic deformation bodies for said shear force transducers.

9. The torque sensor according to claim 3, wherein said shear force transducers are arranged on said inner floor surfaces inside said pocket recesses.

10. The torque sensor according to claim 3, wherein said shear force transducers are arranged on said outer floor surfaces, which all together lie on one of said disc surfaces, which is a radial planar surface bounding one axial side of said flange disc.

11. The torque sensor according to claim 3, wherein said first disc surface is a continuous closed planar surface, all of said blind pocket recesses are recessed into said second disc surface, and all of said outer floor surfaces of said pocket recess floors lie on and are partial surface areas of said first disc surface.

12. The torque sensor according to claim 3, wherein first ones of said blind pocket recesses are recessed into said first disc surface, second ones of said blind pocket recesses are recessed into said second disc surface, said outer floor surfaces of said pocket recess floors of said first blind pocket recesses lie on and are partial surface areas of said second disc surface, and said outer floor surfaces of said pocket recess floors of said second blind pocket recesses lie on and are partial surface areas of said first disc surface.

13. The torque sensor according to claim 12, wherein said first blind pocket recesses and said second blind pocket recesses alternate with one another circumferentially around said flange disc.

14. The torque sensor according to claim 4, wherein said central hub, said fastening ring, said flange disc and said fastening flange are all respectively portions of a one-piece unitary body.

15. The torque sensor according to claim 3, wherein an annular load relief groove is axially recessed into said flange disc radially between said blind pocket recesses and said fastening ring and coaxially about said central hub.

16. The torque sensor according to claim 3, wherein a surface of said central hub and said second disc surface of said flange disc are axially recessed to form a coaxial cylindrical recess relative to an axial outward surface of said fastening ring, and said torque sensor further comprises a measuring electronics circuit mounted in said coaxial cylindrical recess and connected to said shear force transducers, and a cover that hermetically closes said coaxial cylindrical recess.

17. The torque sensor according to claim 3, wherein an encircling dovetail groove is recessed into a circumferential outer rim of said fastening ring, and said torque sensor further comprises an antenna coil secured into said dovetail groove.

18. The torque sensor according to claim 3, wherein said floor surfaces and said shear force transducers each respectively extend on a radial plane normal to an axis of said central hub.

19. A torque sensor comprising two disc-shaped flanges including a fastening flange and a measuring flange that are arranged parallel and axially spaced apart from one another, wherein the flanges are rigidly connected with one another by a radially inwardly positioned torque transmission element and are spaced apart from one another by an encircling spacing groove that is open radially outwardly, wherein the measuring flange has a radially outer fastening ring surface, and at least three axially outwardly open and axially non-through-going measuring pockets on a coaxial circumferential region between the fastening ring surface and the torque transmission element, wherein shear force transducers are applied on closed imperforate base surfaces of the measuring pockets or on closed imperforate pocket outer surfaces axially opposite the base surfaces, wherein the base surfaces form an axially imperforate closed surface as a spring-elastic deformation body, and wherein the measuring pockets are circumferentially separated from one another by stiffening webs, and wherein the coaxial circumferential region of the measuring flange extending radially between the fastening ring surface and the torque transmission element is axially imperforate without axially through-going openings.

* * * * *